(12) United States Patent
Lee et al.

(10) Patent No.: US 12,379,148 B2
(45) Date of Patent: Aug. 5, 2025

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Seungjun Lee, Suwon-si (KR); Hoyoon Song, Suwon-si (KR); Sangyoul Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 18/206,404

(22) Filed: Jun. 6, 2023

(65) Prior Publication Data

US 2024/0019191 A1    Jan. 18, 2024

Related U.S. Application Data

(63) Continuation of application No. PCT/KR2023/004738, filed on Apr. 7, 2023.

(30) Foreign Application Priority Data

Jul. 12, 2022   (KR) .................. 10-2022-0085965

(51) Int. Cl.
    *F25D 21/00*   (2006.01)
(52) U.S. Cl.
    CPC .................. *F25D 21/006* (2013.01)
(58) Field of Classification Search
    CPC .. G06N 3/02; G06N 3/045; G05B 2219/2654; G05B 13/027; F25D 21/006; F25D 21/00
    See application file for complete search history.

(56) References Cited

U.S. PATENT DOCUMENTS

| 5,666,816 A | 9/1997 | Jeong et al. |
| 9,976,791 B2 | 5/2018 | Jung |

(Continued)

FOREIGN PATENT DOCUMENTS

| JP | 06-273033 A | 9/1994 |
| JP | 2022-64576 A | 4/2022 |

(Continued)

OTHER PUBLICATIONS

International Search Report (PCT/ISA/210) issued Jul. 21, 2023 by the International Searching Authority in International Patent Application No. PCT/KR2023/004738.

(Continued)

*Primary Examiner* — Lionel Nouketcha
(74) *Attorney, Agent, or Firm* — Sughrue Mion, PLLC

(57) ABSTRACT

An electronic device includes: at least one memory configured to store information of a first neural network model trained to predict an operation of a refrigerator, and information of a second neural network model trained to obtain information associated with a defrosting of the refrigerator; and at least one processor configured to: obtain first data regarding an operation history of the refrigerator, input the first data to the first neural network model, and obtain, from the first neural network model, second data regarding a prediction result for a future operation of the refrigerator, and input the second data to the second neural network model, and obtain, from the second neural network model, third data including information regarding a degree of frost formation based on an operation of the refrigerator being performed according to the second data, and information regarding controlling a defrost operation of the refrigerator.

20 Claims, 6 Drawing Sheets

(56) References Cited

U.S. PATENT DOCUMENTS

| | | | |
|---|---|---|---|
| 10,465,960 B2 * | 11/2019 | Prabhakaran | G05B 23/027 |
| 10,965,489 B2 | 3/2021 | Han et al. | |
| 11,293,689 B2 | 4/2022 | Hwang et al. | |
| 2006/0181245 A1 | 8/2006 | Mizuno et al. | |
| 2019/0078833 A1 | 3/2019 | Graziano | |
| 2020/0049393 A1 * | 2/2020 | Albets Chico | F25B 49/00 |
| 2020/0076640 A1 | 3/2020 | Han et al. | |
| 2021/0333039 A1 | 10/2021 | Kang | |
| 2023/0068073 A1 | 3/2023 | Song et al. | |

FOREIGN PATENT DOCUMENTS

| | | |
|---|---|---|
| JP | 2022-97876 A | 7/2022 |
| KR | 10-0188926 B1 | 6/1999 |
| KR | 10-0202603 B1 | 6/1999 |
| KR | 10-0595430 B1 | 7/2006 |
| KR | 10-2015-0032404 A | 3/2015 |
| KR | 10-1687237 B1 | 12/2016 |
| KR | 10-2019-0106944 A | 9/2019 |
| KR | 10-2012374 B1 | 10/2019 |
| WO | 2023/033292 A1 | 3/2023 |

OTHER PUBLICATIONS

Written Opinion (PCT/ISA/237) issued Jul. 21, 2023 by the International Searching Authority in International Patent Application No. PCT/KR2023/004738.
Communication dated Jun. 6, 2025, issued by the European Patent Office in European Application No. 23839753.3.

* cited by examiner

ELECTRONIC DEVICE AND CONTROLLING METHOD OF ELECTRONIC DEVICE

CROSS-REFERENCE TO RELATED APPLICATIONS

This application is a continuation of International Application No. PCT/KR2023/004738 designating the United States, filed on Apr. 7, 2023, in the Korean Intellectual Property Receiving Office and claiming priority to Korean Patent Application No. 10-2022-0085965 filed on Jul. 12, 2022, in the Korean Intellectual Property Office. The disclosures of each of these applications are incorporated by reference herein in their entireties.

BACKGROUND

1. Field

This disclosure relates to an electronic device and a controlling method of the electronic device, and more particularly, to an electronic device for preventing excessive frost formation in a refrigerator, optimizing a defrosting operation of a refrigerator, and a controlling method thereof.

2. Description of Related Art

Recently, with rapid developments in technology with respect to artificial intelligence (AI), the technology is being applied to a variety of industrial fields. Specifically, with technology with respect to AI being combined with technology associated with refrigerators, refrigerators of related art have outgrown their existing function, of focusing on preservation of food products, and are able to perform a role as a hub device for internet of things (IoT) function within a household. Further, as various refrigerator functions other than the preservation of food products are being automated and made efficient, user convenience is being increased.

A refrigerator performs an operation of reducing temperature inside the refrigerator by using an evaporator, and during this process, frost may be generated as moisture in a vicinity of the evaporator is frozen to a surface of the evaporator, and the frost is a cause reducing refrigerator efficiency. Accordingly, although the refrigerator may perform a defrosting operation for removing the generated frost, there is a limit to effectively removing frost while maintaining high efficiency of the refrigerator based on related art.

Specifically, because frost is generated, in the refrigerator, as various factors of a surrounding environment (external temperature, internal temperature, humidity, etc.) are applied, an amount of frost and a rate of formation of the frost may vary for each refrigerator. When a defrost cycle of the refrigerator is excessively short, efficiency of the refrigerator may deteriorate and power consumption may rise. On the other hand, when the defrost cycle is excessively long, because frost cannot be removed effectively, the thickened frost may encase the evaporator leading to a problem of a cooling function deteriorating, and energy efficiency decreasing.

SUMMARY

Provided are an electronic device that can prevent a deterioration in efficiency of a refrigerator by preventing an excessive frost formation in the refrigerator while optimizing a defrost operation, and a controlling method of the electronic device.

Additional aspects will be set forth in part in the description which follows and, in part, will be apparent from the description, or may be learned by practice of the presented embodiments.

According to an aspect of the disclosure, an electronic device includes: at least one memory configured to store information of a first neural network model trained to predict an operation of a refrigerator, and information of a second neural network model trained to obtain information associated with a defrosting of the refrigerator; and at least one processor configured to: obtain first data regarding an operation history of the refrigerator, input the first data to the first neural network model, and obtain, from the first neural network model, second data regarding a prediction result for a future operation of the refrigerator, and input the second data to the second neural network model, and obtain, from the second neural network model, third data including information regarding a degree of frost formation based on an operation of the refrigerator being performed according to the second data, and information regarding controlling a defrost operation of the refrigerator.

The electronic device may further include a communicator, and the at least one processor may be further configured to control, based on the third data being obtained from the second neural network model, the communicator to transmit the third data to the refrigerator as instructions for the refrigerator to perform the defrost operation according to the third data.

The information regarding controlling the defrost operation of the refrigerator may include information regarding a cycle of the defrost operation, information regarding a period of the defrost operation per cycle, and information regarding an intensity of the defrost operation per cycle.

The at least one processor may be further configured to: obtain, based on the cycle of the defrost operation according to the information regarding controlling the defrost operation being less than a threshold value, fourth data by changing the information regarding the cycle of the defrost operation to the threshold value in the third data, and control the communicator to transmit the fourth data to the refrigerator.

The at least one processor may be further configured to: obtain information regarding at least one reason associated with a deterioration in efficiency of the refrigerator, based on the first data, and control the communicator to transmit, to the refrigerator, information regarding a guide message corresponding to the at least one reason.

The at least one processor may be further configured to, identify the information regarding the at least one reason based on at least one from among information regarding a temperature range of the refrigerator, information regarding a number of door openings and closings of the refrigerator, information regarding a difference between a maximum temperature inside the refrigerator and a control temperature, or information regarding an outdoor temperature of the refrigerator, and the first data may include the information regarding the temperature range of the refrigerator.

The first data may include information on a revolution per minute (RPM) of a fan of the refrigerator, information of a power consumption of a compressor of the refrigerator, and information of a temperature inside the refrigerator, and the first neural network model is trained to obtain the second data based on the first data, data on a surrounding environment of the refrigerator, and information on a user of the refrigerator.

The second data may include a first prediction value of the RPM of the fan, a second prediction value of the power consumption of the compressor, and a third prediction value of the temperature inside the refrigerator, and the second neural network model is trained to obtain information regarding a degree of excessive frost formation based on the first prediction value, the second prediction value, and the third prediction value.

The first neural network model and the second neural network model may be implemented as one integrated neural network model, and the integrated neural network model is trained according to an end-to-end learning method to obtain the third data based on the first data.

The electronic device and the refrigerator may be implemented as one integrated device, and the at least one processor may be further configured to perform, based on the third data being obtained from the second neural network model, the defrost operation of the refrigerator based on the third data.

According to an aspect of the disclosure, a method of controlling an electronic device, includes: obtaining first data regarding an operating history of a refrigerator; obtaining, based on inputting the first data to a first neural network model trained to predict an operation of the refrigerator, second data regarding a prediction result for a future operation of the refrigerator; and obtaining, based on inputting the second data to a second neural network model trained to obtain information associated with a defrosting of the refrigerator, third data including information regarding a degree of frost formation based on an operation of the refrigerator being performed according to the second data, and information regarding controlling a defrost operation of the refrigerator.

The method may further include transmitting, based on the third data being obtained from the second neural network model, the third data to the refrigerator as instructions for the refrigerator to perform the defrost operation according to the third data.

The information regarding controlling the defrost operation of the refrigerator may include information regarding a cycle of the defrost operation, information regarding a period of the defrost operation per cycle, and information regarding an intensity of the defrost operation per cycle.

The method may further include: obtaining, based on the cycle of the defrost operation according to the information regarding controlling the defrost operation being less than a threshold value, fourth data by changing the information regarding the cycle of the defrost operation to the threshold value in the third data; and transmitting the fourth data to the refrigerator.

The method may further include: obtaining information regarding at least one reason associated with a deterioration in efficiency of the refrigerator, based on the first data; and transmitting information on a guide message corresponding to the at least one reason to the refrigerator.

According to an aspect of the disclosure, a non-transitory computer readable recording medium stores a program that is executed by at least one processor of an electronic device to perform a method of controlling the electronic device, the method including: obtaining first data regarding an operating history of a refrigerator; obtaining, based on inputting the first data to a first neural network model trained to predict an operation of the refrigerator, second data regarding a prediction result for a future operation of the refrigerator; and obtaining, based on inputting the second data to a second neural network model trained to obtain information associated with a defrosting of the refrigerator, third data including information regarding a degree of frost formation based on an operation of the refrigerator being performed according to the second data, and information regarding controlling a defrost operation of the refrigerator.

The method may further include transmitting, based on the third data being obtained from the second neural network model, the third data to the refrigerator as instructions for the refrigerator to perform the defrost operation according to the third data.

The information regarding controlling the defrost operation of the refrigerator may include information regarding a cycle of the defrost operation, information regarding a period of the defrost operation per cycle, and information regarding an intensity of the defrost operation per cycle.

The method may further include: obtaining, based on the cycle of the defrost operation according to the information regarding controlling the defrost operation being less than a threshold value, fourth data by changing the information regarding the cycle of the defrost operation to the threshold value in the third data; and transmitting the fourth data to the refrigerator.

The method may further include: obtaining information regarding at least one reason associated with a deterioration in efficiency of the refrigerator, based on the first data; and transmitting information on a guide message corresponding to the at least one reason to the refrigerator.

BRIEF DESCRIPTION OF THE DRAWINGS

The above and other aspects, features, and advantages of specific embodiments of the present disclosure will be more apparent from the following description with reference to the accompanying drawings, in which.

DETAILED DESCRIPTION

Figure 1:
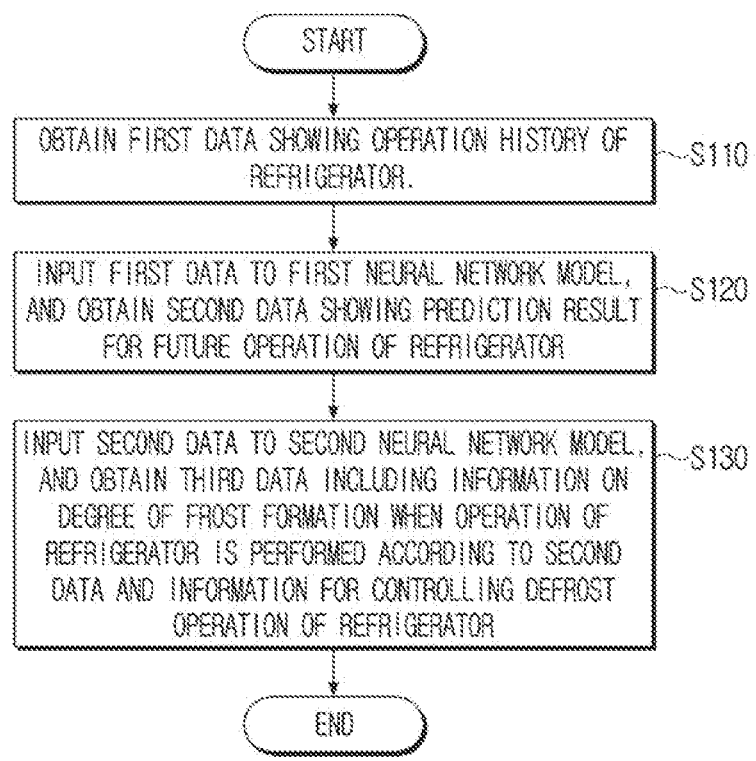
FIG. 1 is a flowchart illustrating a controlling method of an electronic device according to an embodiment.

Terms used in the specification will be briefly explained, and then the disclosure will be described in detail.

Although the terms used in the embodiments of the disclosure are selected from general terms, which are currently in wide use, in consideration of their functions in the disclosure, the terms may be changed depending on an intention of a person skilled in the art, a precedent, and an emergence of a new technology. In addition, in certain circumstances, some terms may be arbitrarily chosen by the applicant. In this case, their meanings will be explained in detail in the corresponding parts of the description of the disclosure. Therefore, the terms used in the disclosure should be defined based on the meanings thereof and the overall content of the disclosure, rather than simply based on what these terms are called.

Various modifications may be made to the embodiments of this disclosure, and there may be various types of embodiments. Accordingly, specific embodiments will be illustrated in drawings, and the embodiments will be described in detail in the detailed description. However, it should be noted that the various embodiments are not for limiting the scope of this disclosure to a specific embodiment, but they should be interpreted to include all modifications, equivalents or alternatives of the embodiments disclosed herein. In describing the embodiments, like reference numerals may be used to refer to like elements.

In case it is determined that in describing the embodiments, detailed description of related known technologies may unnecessarily confuse the gist of this disclosure, the detailed description will be omitted.

Further, the embodiments below may be modified to various different forms, and it is to be understood that the scope of the technical spirit of this disclosure is not limited to the embodiments below. Rather, the embodiments are provided so that this disclosure will be thorough and complete, and to fully convey the technical spirit of this disclosure to those skilled in the art.

Terms used herein have merely been used to describe a specific embodiment, and not to limit the scope of another embodiment. A singular expression includes a plural expression, unless otherwise specified.

In this disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

In this disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) only A, (2) only B, or (3) both of A and B.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in this disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a Central Processing Unit (CPU) or an application processor) capable of performing the corresponding operations by executing one or more software programs stored in the memory device.

The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

The various elements and areas of the drawings have been schematically illustrated. Accordingly, the embodiments of this disclosure are not limited by relative sizes and distances illustrated in the accompanied drawings.

Embodiments according to this disclosure will be described in detail with reference to the accompanying drawings below to aid in the understanding of those skilled in the art.

FIG. 1 is a flowchart illustrating a controlling method of an electronic device 100 according to an embodiment.

The electronic device 100 according to an embodiment may refer to a device which can predict an operation of the refrigerator and obtain information for controlling a defrost operation of the refrigerator. The electronic device 100 according to an embodiment may be implemented as a server which is a device separate from the refrigerator, and in this case, the electronic device 100 may obtain information for controlling the defrost operation of the refrigerator, and control for the defrost operation to be performed by the refrigerator by transmitting the obtained information to the refrigerator. The electronic device 100 may be implemented integrated with the refrigerator as one device, and in this case, the electronic device 100 may obtain information for controlling the defrost operation of the refrigerator, and control the defrost operation of the refrigerator based on the obtained information.

In other words, the electronic device 100 according to an embodiment may not only be implemented as a device separate from the refrigerator, but also implemented as the refrigerator itself. Accordingly, describing by distinguishing the electronic device 100 and the refrigerator below is merely for convenience of description, and does not necessarily imply the electronic device 100 according to an embodiment can only be implemented as a separate device which is distinguished from the refrigerator.

The refrigerator may keep food cold by generating cold air through a continuous repetition of compressing, condensing, expanding, and evaporating a refrigerant. Specifically, when the refrigerant in a compressed liquid state passes the evaporator of the refrigerator, the refrigerant may absorb heat energy as the refrigerant vaporizes according to a pressure difference, and accordingly, the temperature inside the refrigerator may decrease. Further, because the refrigerant reduces the temperature as the refrigerant passes through the evaporator, moisture around the evaporator may freeze and form at a surface of the evaporator generating frost, and the refrigerator may cyclically perform the defrost operation to remove the generated frost. In this disclosure, the term 'defrost operation' may be substituted with terms such as, for example, and without limitation, a defrost process, a defrost step, or the like.

In the refrigerator, because frost is generated as various factors of the surrounding environment (external temperature, internal temperature, humidity, etc.) are applied, the amount of frost and the rate of formation may vary according to each refrigerator. However, when a defrost cycle of the refrigerator is excessively short, efficiency of the refrigerator may deteriorate and power consumption may rise. On the other hand, when the defrost cycle is excessively long, because frost cannot be removed effectively, the thickened frost may encase the evaporator leading to the cooling function deteriorating and to the energy efficiency decreasing.

Accordingly, because there is a need to predict the formation of frost in the refrigerator in advance and optimize the defrost cycle, an embodiment of this disclosure will be described below with reference to FIG. 1.

As shown in FIG. 1, the electronic device 100 according to an embodiment may obtain first data which shows an operation history of the refrigerator (S110).

In describing this disclosure, the term 'first data' may be used as a term for collectively referring to data that shows the operation history of the refrigerator. Specifically, the operation history of the refrigerator may include parameters associated with an operation of the refrigerator, data showing a state of the refrigerator when operating the refrigerator, and the like. Then, the operation history of the refrigerator may include an operation history from a past to a present time point, and whether to include data until a random time point of the past to the first data may vary according to an embodiment.

For example, the first data may include at least one from among information on a revolution per minute (RPM) of a fan included in the refrigerator, information on power consumption of the compressor included in the refrigerator, and information on a temperature inside the refrigerator. In addition thereto, the first data may further include at least one from among information on a number of door openings and closings of the refrigerator, and information such as a sensing value of a sensor inside the refrigerator, a sensing value of a defrost sensor of the refrigerator, and the like. In addition thereto, as long as it is data showing the operation history of the refrigerator, the data may be included in the first data in addition to the above-described example.

The electronic device 100 may input the first data to a first neural network model, and obtain second data showing a prediction result for a future operation of the refrigerator (S120).

The first neural network model may refer to a neural network model trained to obtain a prediction result for a future operation of the refrigerator. Specifically, if the first data is input to the first neural network model, the first neural network model may be trained to output a prediction result for whether the refrigerator is to perform any operation in the future based on the operation history of the refrigerator included in the first data. Predicting an operation to which time point in the future may vary according to the embodiment.

In describing this disclosure, the term 'second data' may be used as a term for collectively referring to data that shows a prediction result for an operation of the refrigerator. Specifically, like the prediction result for the operation of the refrigerator or the operation history of the refrigerator, a parameter associated with an operation of the refrigerator, data showing the state of the refrigerator when operating the refrigerator, and the like may be included in the second data.

For example, the second data may include at least one from among a first prediction value for the RPM of the fan included in the refrigerator, a second prediction value for the power consumption of the compressor included in the refrigerator, and a third prediction value for the temperature inside the refrigerator.

That is, while the first data may be data that shows the operation history from the past to the present time point, the second data may be prediction data of the future based on the first data. Both are different in terms of an obtaining time point and are same in that both the first data and the second data basically includes a parameter associated with an operation of the refrigerator and data showing a state of the refrigerator when operating the refrigerator. However, the first data and the second data do not necessarily include information of a same type, and information included in the first data may not be included in the second data, and information included in the second data may not be included in the first data.

According to an embodiment, the first neural network model may be trained to obtain the second data based on data on a surrounding environment of the refrigerator together with the first data and information on a user of the refrigerator. For example, data on the surrounding environment may include information on a temperature, humidity, a location, and the like in the surrounding of the refrigerator, and information on the user may include a user profile information, information on a use history of the user, and the like.

The electronic device 100 may input the second data to a second neural network model, and obtain third data including information on a degree of frost formation when an operation of the refrigerator is performed according to the second data and information for controlling the defrost operation of the refrigerator (S130).

The second neural network model may refer to a neural network model trained to obtain information associated with the defrost operation of the refrigerator. Specifically, when the second data according to an output of the first neural network model is input to the second neural network model, the second neural network model may be trained to obtain the third data including information on the degree of frost formation with respect to the evaporator and information for controlling the defrost operation of the refrigerator based on a correlation between various parameters included in the second data and the evaporator of the refrigerator.

According to an embodiment, the second neural network model may be trained to obtain information on a degree of excessive frost formation based on the first prediction value, the second prediction value, and the third prediction value as described above.

According to an embodiment, the second neural network model may be trained to obtain only information on the degree of frost formation, and the electronic device 100 may obtain information for controlling the defrost operation of the refrigerator based on information on the degree of frost formation obtained through the second neural network model.

In describing this disclosure, the term 'third data' may be used as a term for collectively referring to data associated with the defrost operation of the refrigerator. Specifically, the third data may include at least one from among information on the degree of frost formation and information for controlling the defrost operation.

Here, the information on the degree of frost formation may include information on an amount of frost formed with respect to the evaporator of the refrigerator and information on a result of determining whether there is excessive frost formation with respect to the evaporator.

The information for controlling the defrost operation of the refrigerator may include at least one from among information on a cycle of the defrost operation (defrost operation cycle), information on a period of the defrost operation per defrost cycle, and information on an intensity of the defrost operation per defrost cycle. Here, the information on the period of the defrost operation per defrost cycle may refer to information on a length of a section in which each defrost operation is performed when the defrost operation is performed at each cycle, and the information on the intensity of the defrost operation per defrost cycle may refer to information for determining a parameter that form each defrost operation when the defrost operation is performed at each cycle.

In the above, the first data and the second data have been described as being input to the first neural network model and the second neural network model, respectively, but specifically, the first data and the second data may be input to the first neural network model and the second neural network model after being respectively converted to a feature value (vector) corresponding thereto. Furthermore, the first data and the second data may be input to the first neural network model and the second neural network model after a preprocessing process such as processing, deleting, and extracting of data with respect to the first data and the second data is performed.

In the above, the first neural network model and the second neural network model have been described under an assumption of being implemented as a separate neural network model, but this is merely one embodiment, and the first neural network model and the second neural network model may be implemented as one integrated neural network model, and in this case, the integrated neural network model may be trained according to an end-to-end learning method to obtain the third data based on the first data.

As described above, when the third data is obtained, the electronic device 100 may directly or indirectly control the defrost operation of the refrigerator by using the third data. Specifically, if the electronic device 100 and the refrigerator are implemented as separate devices, the electronic device 100 may transmit the third data to the refrigerator for the refrigerator to perform the defrost operation according to the third data. If the electronic device 100 and the refrigerator are implemented as one device, the electronic device 100 may control the defrost operation of the refrigerator based on the third data. If the electronic device 100 and the refrigerator are implemented as one device, the first neural network model and the second neural network model may be implemented in an on-device form within the electronic device 100.

According to the above-described embodiment, the electronic device 100 may prevent the excessive frost formation in the refrigerator, while preventing a deterioration in efficiency of the refrigerator by optimizing the defrost operation.

Figure 2:
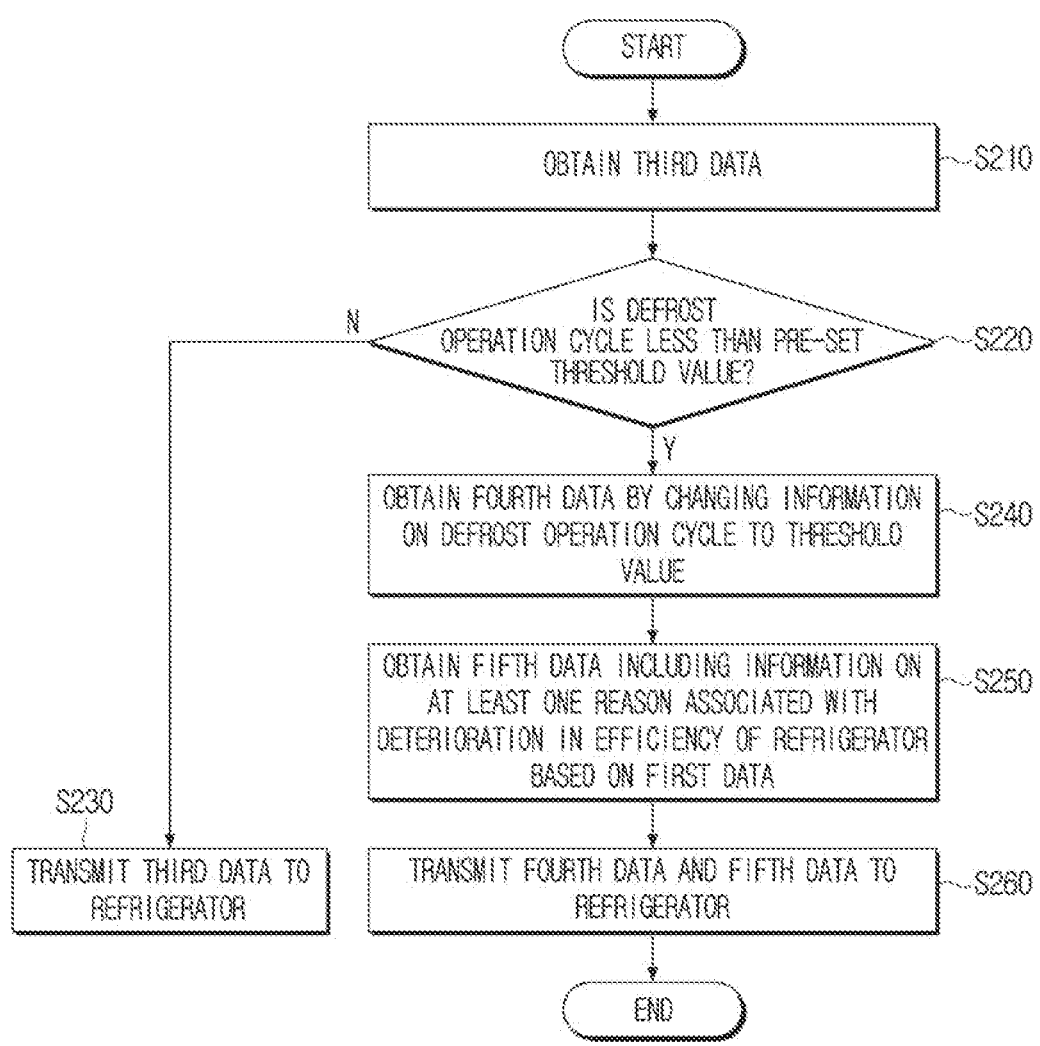
FIG. 2 is a flowchart illustrating a controlling method of an electronic device according to an embodiment.

FIG. 2 is a flowchart illustrating a controlling method of the electronic device 100 according to an embodiment.

In the description of FIG. 1, an embodiment of information on the defrost cycle of the refrigerator being obtained based on the third data which is an output of the second neural network model, and the defrost cycle of the refrigerator being controlled based on information on the defrost cycle has been described. However, if the defrost cycle determined according to the embodiment of FIG. 1 is excessively short, efficiency of the refrigerator may rather deteriorate as the defrost operation is excessively and frequently performed.

Accordingly, according to an embodiment, the electronic device 100 may set a threshold value for the defrost cycle, and limit the defrost cycle of the refrigerator to the threshold value when the defrost cycle determined based on the third data is less than the threshold value. An embodiment of considering the threshold value for the defrost cycle will be described below with reference to FIG. 2. In describing FIG. 2, the electronic device 100 and the refrigerator being implemented as separate devices will be described for convenience of description, but it is to be understood that the features of such embodiment may be implemented by the electronic device 100 and the refrigerator as one device.

As shown in FIG. 2, when the third data is obtained (S210), the electronic device 100 may identify whether the defrost operation cycle is less than a pre-set threshold value (S220). Specifically, the electronic device 100 may identify the defrost operation cycle of the electronic device 100 included in the third data, and identify whether the identified defrost operation cycle is less than the pre-set threshold value. Here, the pre-set threshold value may refer to a defrost cycle value set by a developer or the user, and may be changed according to an embodiment.

If the defrost operation cycle is identified as being greater than or equal to the pre-set threshold value (S220—N), the electronic device 100 may transmit the third data to the refrigerator (S230). Then, based on the above, the refrigerator may perform the defrost operation according to the third data.

On the other hand, if the defrost operation cycle is identified as being less than the pre-set threshold value (S220—Y), the electronic device 100 may obtain fourth data by changing the information on the defrost operation cycle to the threshold value (S240). That is, in describing this disclosure, the term 'fourth data' may be used to refer to data generated to substitute the defrost operation cycle to the threshold value from among the information included in the third data, and for the remaining information to be maintained.

When the fourth data is obtained, the electronic device 100 may obtain fifth data including information on at least one reason associated with the deterioration in efficiency of refrigerator based on the first data (S250). Specifically, the electronic device 100 may identify information on at least one reason based on at least one from among information on a temperature range of the refrigerator included in the first data, information on the number of door openings and closings of the refrigerator, information on a difference between the maximum temperature inside the refrigerator and the control temperature, and information on an outdoor temperature of the refrigerator.

Here, the information on the reason associated with the deterioration in efficiency of the refrigerator may include information of the temperature range of the refrigerator exceeding a normal range, information of the number of door openings and closings of the refrigerator exceeding the normal range, information of the difference between the maximum temperature inside the refrigerator and the control temperature exceeding the normal range, and information of the outdoor temperature of the refrigerator exceeding the normal range.

When the fourth data and the fifth data are obtained, the electronic device 100 may transmit the fourth data and the fifth data to the refrigerator (S260). Here, the fifth data may include information on a guide message corresponding to the at least one reason. A process of identifying the reason associated with the deterioration in efficiency of the refrigerator and a specific type of the guide message will be described in greater detail with reference to FIG. 3. According to an embodiment, only one data from among the fourth data or the fifth data may be transmitted to the refrigerator.

According to the embodiments described above with reference to FIG. 2, the electronic device 100 may effectively prevent the deterioration in efficiency of the refrigerator by limiting the defrost cycle to the threshold value when the defrost cycle of the refrigerator determined based on the third data is excessively short.

Figure 3:
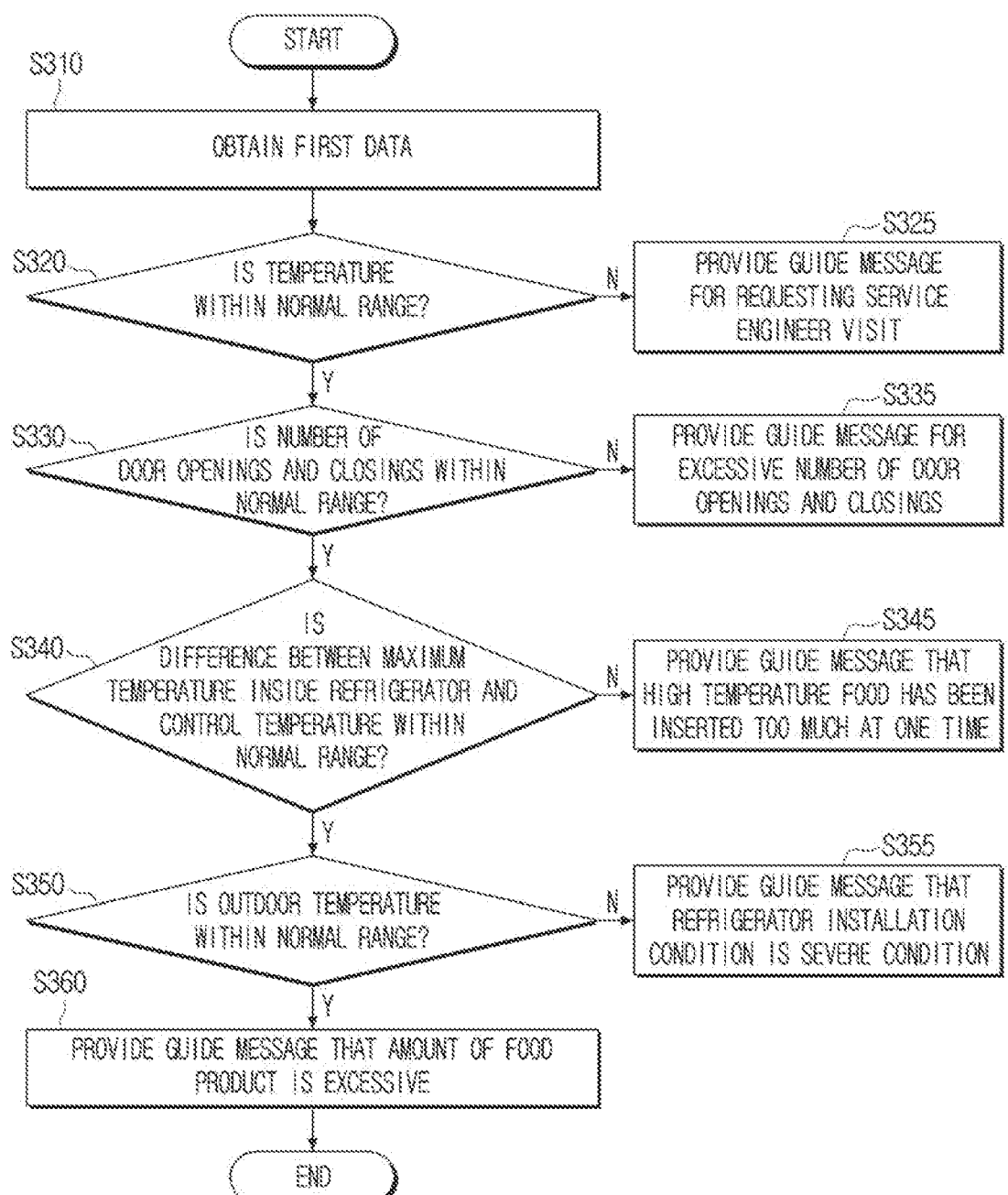
FIG. 3 is a flowchart illustrating a controlling method of an electronic device according to an embodiment.
Figure 4:
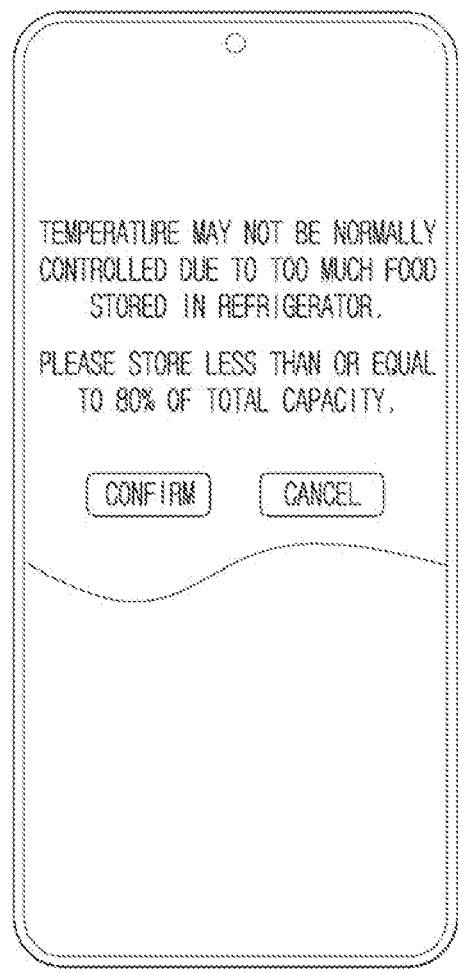
FIG. 4 is a diagram illustrating an example of a user interface according to an embodiment.

FIG. 3 is a flowchart illustrating a controlling method of the electronic device 100 according to an embodiment. Further, FIG. 4 is a diagram illustrating an example of a user interface according to an embodiment In the description of FIG. 2, an embodiment of obtaining the fifth data that includes information on the reason associated with the deterioration in efficiency of the refrigerator has been described. The process of identifying the reason associated with the deterioration in efficiency of the refrigerator and types of the guide message that correspond to the identified reason will be described in greater detail below with reference to FIG. 3.

As shown in FIG. 3, when the first data is obtained (S310), the electronic device 100 may identify whether the temperature of the refrigerator is within the normal range (S320). Then, if the temperature of the refrigerator is identified as exceeding the normal range based on identification (S320—N), the electronic device 100 may provide a guide message for requesting a service engineer visit (S325). That is, because it is preferable to receive repairs for the refrigerator by requesting a visit by a service engineer when it is identified that an excessive frost formation has occurred due to the reason of the temperature of the refrigerator exceeding the normal range, the electronic device 100 may provide, to the user, a guide message for recommending to request the service engineer visit.

If the temperature of the refrigerator is identified as within the normal range based on identification (S320—Y), the electronic device 100 may identify whether the number of door openings and closings of the refrigerator is within the normal range (S330). Then, if the number of door openings and closings is identified as exceeding the normal range based on identification (S330—N), the electronic device 100 may provide a guide message for the excessive number of door openings and closings (S335). That is, because it is preferable for the user to reduce the number of door openings and closings when it is identified that an excessive frost formation has occurred due to the reason of the temperature of the refrigerator exceeding the normal range, the electronic device 100 may provide, to the user, a guide message for recommending to reduce the number of door openings and closings.

If the number of door openings and closings of the refrigerator is identified as within the normal range based on identification (S330—Y), the electronic device 100 may identify whether the difference between the maximum temperature inside the refrigerator and the control temperature is within the normal range (S340). Then, if the difference between the maximum temperature inside the refrigerator and the control temperature is identified as exceeding the normal range based on identification (S340—N), the electronic device 100 may provide a guide message that high temperature food has been inserted too much at one time (S345). That is, because it is preferable for the user to not insert the high temperature food too much at one time when it is identified that an excessive frost formation has occurred due to the reason of the difference between the maximum temperature inside the refrigerator and the control temperature exceeding the normal range, the electronic device 100 may provide, to the user, a guide message for recommending to not insert the high temperature food too much at one time.

If the difference between the maximum temperature inside the refrigerator and the control temperature is identified as within the normal range based on identification (S340—Y), the electronic device 100 may identify whether the outdoor temperature of the refrigerator is within the normal range (S350). Then, if the outdoor temperature of the refrigerator is identified as exceeding the normal range based on identification (S350—N), the electronic device 100 may provide a guide message that an installation condition of the refrigerator is a severe condition (S355). That is, because it is preferable to change the installation condition of the refrigerator when it is identified that an excessive frost formation has occurred due to the reason of the outdoor temperature of the refrigerator exceeding the normal range, the electronic device 100 may provide, to the user, a guide message that recommends to change the installation condition of the refrigerator.

If the outdoor temperature of the refrigerator is identified as within the normal range based on identification (S350—Y), the electronic device 100 may provide a guide message for an amount of food being stored in the refrigerator being excessive (S360). In other words, because there is a high likelihood of excessive frost formation occurring due to the reason of the amount of food product being excessive when the temperature of the refrigerator, the number of door openings and closings, the difference between the maximum temperature inside the refrigerator and the control temperature, and even the outdoor temperature all being within the normal range, the electronic device 100 may provide, to the user, a guide message that recommends to reduce the amount of food product being stored in the refrigerator.

The guide message as described above may be provided not only through a display included in the refrigerator, a speaker, or the like, but also provided through a display of a user terminal connected with the refrigerator, the speaker, or the like. For example, as shown in FIG. 4, the display of the user terminal may display a user interface (UI) that includes a guide message such as "Temperature may not be normally controlled due to too much food stored in the refrigerator. Please store less than or equal to 80% of total capacity." In addition, the UI may include, as shown in FIG. 4, a UI item ("confirm" and "cancel" in FIG. 4) for receiving a user response to the guide message.

FIG. 3 and FIG. 4 are to merely show an embodiment according to this disclosure, and an order of identifying the reason associated with the deterioration in efficiency of the refrigerator, the type of the guide message, a method of displaying the guide message, and the like may be implemented differently from the examples described with reference to FIG. 3 and FIG. 4.

A controlling method of the electronic device 100 as described above with reference to FIG. 1, FIG. 2, and FIG. 3 may be provided to the electronic device 100 by being implemented with a program. Specifically, the program including the controlling method of the electronic device 100 may be provided stored in a non-transitory computer readable medium.

Specifically, the non-transitory computer readable medium including the program that executes the controlling method of the electronic device 100 may include obtaining the first data that shows the operation history of the refrigerator, obtaining, based on inputting the first data to the first neural network model for predicting an operation of the refrigerator, second data that shows the prediction result for a future operation of the refrigerator, and obtaining, based on inputting the second data to the second neural network model for obtaining information associated with the defrosting of the refrigerator, the third data including information on the degree of frost formation when an operation of the refrigerator is performed according to the second data and information for controlling the defrost operation of the refrigerator.

According to the embodiment described above with reference to FIG. 3, the electronic device 100 may have an appropriate action taken to prevent deterioration in efficiency of the refrigerator by identifying the reason associated with the deterioration in efficiency of the refrigerator and providing a guide message corresponding thereto to the user.

Figure 5:
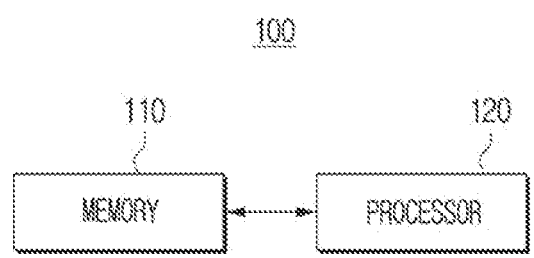
FIG. 5 is a block diagram illustrating in brief a configuration of an electronic device according to an embodiment.
Figure 6:
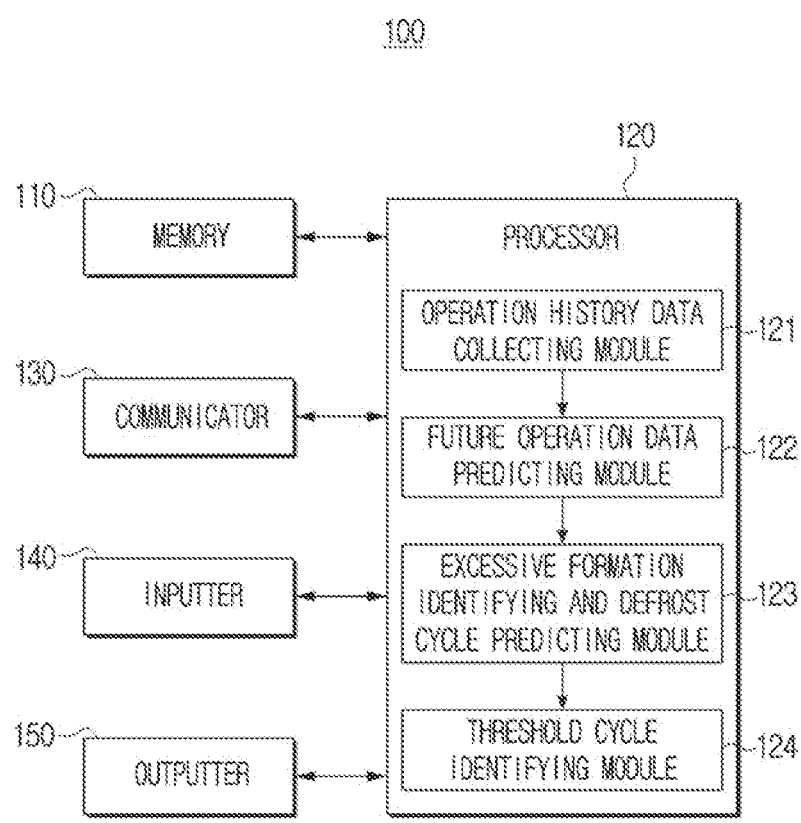
FIG. 6 is a block diagram illustrating in detail a configuration of an electronic device according to an embodiment.

FIG. 5 is a block diagram illustrating in brief a configuration of the electronic device 100 according to an embodiment. Further, FIG. 6 is a block diagram illustrating in detail a configuration of the electronic device 100 according to an embodiment.

As shown in FIG. 5, the electronic device 100 according to an embodiment may include a memory 110 and a processor 120. In addition, as shown in FIG. 6, the electronic device 100 may further include a communicator 130, an inputter 140, and an outputter 150. However, the configurations as shown in FIG. 5 and FIG. 6 are merely examples, and new configurations may be added or some configurations may be omitted in addition to the configurations as shown in FIG. 5 and FIG. 6 in implementing this disclosure.

In the memory 110, at least one instruction associated with the electronic device 100 may be stored. Further, an Operating System (O/S) for driving the electronic device 100 may be stored in the memory 110. In addition, various software programs or applications for the electronic device 100 to operate according to various embodiments of this disclosure may be stored in the memory 110. Further, the memory 110 may include a semiconductor memory such as a flash memory, a magnetic storage medium such as a hard disk, or the like.

Specifically, various software modules for the electronic device 100 to operate according to the various embodiments of this disclosure may be stored in the memory 110, and the processor 120 may control an operation of the electronic device 100 by executing various software modules stored in the memory 110. That is, the memory 110 may be accessed by the processor 120 and reading/writing/modifying/deleting/updating of data may be performed by the processor 120.

In this disclosure, the term 'memory 110' may be used as a meaning that includes the memory 110, a read only memory (ROM) in the processor 130, a random access memory (RAM), or a memory card (e.g., a micro SD card, a memory stick) mounted to the electronic device 100.

Specifically, according to the various embodiments of this disclosure, the memory 110 may be stored with information on the first neural network model for predicting an operation of the refrigerator and information on the second neural network model for obtaining information associated with the defrosting of the refrigerator. Here, the information on the first neural network model and the information on the second neural network model may include learning data for training the first neural network model and the second neural network model, and information on layers and parameters that form the first neural network model and the second neural network model, respectively. In addition, the memory 110 may be stored with the first data, the second data, the third data, the fourth data, and the fifth data according to this disclosure. Further, the memory 110 may be stored with information associated with the deterioration in efficiency of the refrigerator.

In addition to the above, various information necessary within the scope of achieving an object of this disclosure may be stored in the memory 110, and information stored in the memory 110 may be updated by being received from an external device or input by the user.

The processor 120 may control the overall operation of the electronic device 100. Specifically, the processor 120 may be connected with a configuration of the electronic device 100 that includes the memory 110, and control the overall operation of the electronic device 100 by executing at least one instruction stored in the memory 110 as described above.

The processor 120 may be implemented through various methods. For example, the processor may be implemented as at least one from among an Application Specific Integrated Circuit (ASIC), an embedded processor, a microprocessor, a hardware control logic, a hardware Finite State Machine (FSM), or a Digital Signal Processor (DSP). The term 'processor 120' used herein may be used as a meaning that includes a Central Processing Unit (CPU), a Graphic Processing Unit (GPU), a Main Processing Unit (MPU), and the like.

According to an embodiment, the processor 120 may obtain the first data showing the operation history of the refrigerator, input the first data to the first neural network model and obtain the second data showing the prediction result for a future operation of the refrigerator, and input the second data to the second neural network model and obtain the third data including information on the degree of frost formation when an operation of the refrigerator is performed according to the second data and information for controlling the defrost operation of the refrigerator.

According to an embodiment, the processor 120 may obtain, based on the defrost operation cycle according to the information for controlling the defrost operation being less than the pre-set threshold value, the fourth data by changing the information on the defrost operation cycle to the threshold value in the third data, and control the communicator 130 to transmit the fourth data to the refrigerator. Then, the processor 120 may obtain the information on at least one reason associated with the deterioration in efficiency of the refrigerator based on the first data, and control the communicator 130 to transmit the information on the guide message corresponding to the at least one reason to the refrigerator.

Because the various embodiments according to this disclosure based on the control of the processor 120 have been described above with reference to FIG. 1, FIG. 2, FIG. 3, and FIG. 4, redundant descriptions for substantially the same descriptions will be omitted.

The communicator 130 may include circuitry, and perform communication with external devices. Specifically, the processor 120 may receive various data or information from the external device connected through the processor 130, and transmit various data or information to the external device.

The communicator 130 may include at least one from among a Wi-Fi module, a Bluetooth module, a wireless communication module, a near field communication (NFC) module, and an ultra wide band (UWB) module. Specifically, the Wi-Fi module and the Bluetooth module may perform communication in a Wi-Fi method and a Bluetooth method, respectively. When using the Wi-Fi module or the Bluetooth module, various connection information such as a service set identifier (SSID) is first transmitted and received, and various information may be transmitted and received after communicatively connecting by using the various connection information.

In addition, the wireless communication module may perform communication according to various communication standards such as, for example, and without limitation, IEEE, ZigBee, 3rd Generation (3G), 3rd Generation Partnership Project (3GPP), Long Term Evolution (LTE), 5th Generation (5G), and the like. Further, the NFC module may perform communication in an NFC method using a 13.56 MHz band from among the various radio-frequency identification (RFID) frequency bands such as, for example, and without limitation, 135 kHz, 13.56 MHz, 433 MHz, 860-960 MHz, 2.45 GHz, or the like. In addition, the UWB module may accurately measure, through communication between UWB antennas, a Time of Arrival (ToA) which is time at which a pulse reaches a target object, and an Angle of Arrival (AoA) which is an angle at which a pulse arrives at from a transmission device. Thereby, an accurate distance and position recognition may be possible within an error range of within tens of centimeters (cm) indoors.

Specifically, according to the various embodiments of this disclosure, the processor 120 may also receive the first data showing the operation history of the refrigerator from the refrigerator through the communicator 130.

In addition, when the third data is obtained through the second neural network model, the processor 120 may control the communicator 130 to transmit the third data to the refrigerator for the refrigerator to perform the defrost operation according to the third data.

Then, the processor 120 may control the communicator 130 for the fourth data and the fifth data according to this disclosure to be transmitted to the refrigerator as described above, and control the communicator 130 to transmit the fifth data to the user terminal.

Specifically, the processor 120 may include multiple modules such as, an operation history data collecting module, a future operation data predicting module, an excessive formation identifying and defrost cycle predicting module, and a threshold cycle identifying module. Further, each module may be implemented with a hardware module or a software module. The information on the modules may be stored in the memory 110, and the processor 120 may realize an embodiment according to this disclosure through the modules by loading the information of the modules stored in the memory 110.

The operation history data collecting module 121 may refer to a module for collecting data that shows the operation history of the refrigerator. Specifically, the operation history data collecting module 121 may collect data, that is, first data, showing the operation history by receiving parameters associated with an operation of the refrigerator from the past to the present time point from the refrigerator, data showing a state of the refrigerator when operating the refrigerator, and the like through the communicator 130.

The future operation data predicting module 122 may refer to a module for obtaining the prediction result for a future operation of the refrigerator. Specifically, when the first data is obtained through the operation history data collecting module 121, the future operation data predicting module 122 may input the first data to the first neural network model and obtain the second data, that is, the prediction result for a future operation of the refrigerator.

The excessive formation identifying and defrost cycle predicting module 123 may refer to a module for obtaining information on the degree of frost formation when an operation of the refrigerator is performed and information for controlling the defrost operation of the refrigerator. Specifically, when the second data is obtained through the future operation data predicting module 122, the excessive formation identifying and defrost cycle predicting module 123 may input the second data to the second neural network model and obtain the third data, that is, information on the degree of frost formation with respect to the evaporator and information for controlling the defrost operation of the refrigerator.

The threshold cycle identifying module 124 may refer to a module for identifying whether the defrost cycle determined based on the third data is less than the threshold value, and for performing an operation according to an identification result. Specifically, when the third data is obtained through the excessive formation identifying and defrost cycle predicting module 123, the threshold cycle identifying module 124 may identify whether the defrost operation cycle is less than the pre-set threshold value, and if the defrost operation cycle is less than the pre-set threshold value, obtain the fourth data by changing the information on the defrost operation cycle to the threshold value. According to an embodiment, the process of obtaining the fifth data according to this disclosure and even the process of controlling the communicator 130 to transmit the fourth data and the fifth data to the refrigerator or the user terminal may be performed through the threshold cycle identifying module 124.

The modules as described in the above are merely to describe that the operations performed by processor 120 may be performed through the modules, respectively, and other modules in addition to the modules as described above may be added or some modules from among the modules as described above may be omitted.

The inputter 140 may include circuitry, and the processor 120 may receive a user command for controlling an operation of the electronic device 100 through the inputter 140. Specifically, the inputter 140 may be formed with configurations such as, for example, and without limitation, a microphone, a camera (not shown), a remote controller signal receiver (not shown), and the like. Further, the inputter 140 may be implemented in a form included in the display as a touch screen. Specifically, the microphone may receive a voice signal, and convert the received voice signal to an electrical signal.

According to the various embodiments of this disclosure, the processor 120 may receive the user command for obtaining the information on the degree of frost formation and the information for controlling the defrost operation of the refrigerator according to this disclosure through the inputter 140.

The outputter 150 may include circuitry, and the processor 120 may output various functions that can be performed by the electronic device 100 through the outputter 150. Further, the outputter 150 may include at least one from among the display, the speaker, and an indicator.

The display may output image data by the control of the processor 120. Specifically, the display may output an image pre-stored in the memory 110 by the control of the processor 120. Specifically, the display according to an embodiment may also display a user interface stored in the memory 110. The display may be implemented as a liquid crystal display (LCD) panel, organic light emitting diodes (OLED), and the like, and the display may also be implemented as a flexible display, a transparent display, and the like according to circumstance. However, the display according to this disclosure is not limited to a specific type.

The speaker may output audio data by the control of the processor 120, and the indicator may light up by the control of the processor 120.

Specifically, according to the various embodiments of this disclosure, when the electronic device 100 and the refrigerator are implemented as one integrated device, the processor 120 may output a guide message corresponding to at least one reason associated with the deterioration in efficiency of the refrigerator through the outputter 150. For example, the processor 120 may control the display to display a user interface that includes a guide message, and control the speaker to output the guide message in the form of a voice signal.

According to the various embodiments of this disclosure as described above, the electronic device 100 may prevent the deterioration in efficiency of the refrigerator by preventing the excessive frost formation in the refrigerator, while also optimizing the defrost operation.

In addition, the electronic device 100 may effectively prevent, based on the defrost cycle of the refrigerator determined by using the neural network model being excessively short, the deterioration in efficiency of the refrigerator by limiting the defrost cycle to the threshold value.

Further, the electronic device 100 may have an appropriate action taken to prevent deterioration in efficiency of the refrigerator by identifying the reason associated with the deterioration in efficiency of the refrigerator and providing a guide message corresponding thereto to the user.

Functions associated with the first neural network model and the second neural network model as described in the above may be performed through the memory 110 and the processor 120.

The processor 120 may include one or multiple processors 120. At this time, the one or the multiple processors 120 may be a generic-purpose processor 120 such as a central processing unit (CPU) or an application processor (AP), a graphics dedicated processor 120 such as a graphics processing unit (GPU) or a vision processing unit (VPU), or an artificial intelligence dedicated processor 120 such as a neural processing unit (NPU).

The one or the multiple processors 120 may be configured to control so as to process input data according to a pre-defined operation rule or an artificial intelligence model stored in a non-volatile memory 110 and a volatile memory 110. The pre-defined operation rule or the artificial intelligence model may be formed through learning.

The rule or model created through learning may refer to a pre-defined operation rule or an artificial intelligence model of a desired characteristic being formed by applying a learning algorithm to multiple learning data. The learning may be carried out in the machine itself in which the artificial intelligence according to this disclosure is performed, or carried out through a separate server/system.

The artificial intelligence model may include multiple neural network layers. Each layer may include multiple weight values, and perform processing of the layers through the processing results of a previous layer and the processing of the multiple weight values. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Networks (GAN), and a Deep-Q Networks, and the neural network of this disclosure is not limited to the above-described examples, unless otherwise specified.

The learning algorithm may be a method for training a predetermined target machine (e.g., robot) to make decisions or predictions on its own using the multiple learning data. Examples of the learning algorithm may include a supervised learning, an unsupervised learning, a semi-supervised learning, or a reinforcement learning, and the learning algorithm of this disclosure is not limited to the above-described examples unless otherwise specified.

A machine-readable storage medium may be provided in a form of a non-transitory storage medium. Here, the 'non-transitory storage medium' merely means that the storage medium is a tangible device, and does not include a signal (e.g., electromagnetic waves), and the term does not differentiate data being semi-permanently stored or being temporarily stored in the storage medium. In an example, the 'non-transitory storage medium' may include a buffer in which data is stored temporarily.

According to an embodiment, a method according to the various embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online (e.g., downloaded or uploaded) through an application store (e.g., PLAYSTORE™) or directly between two user devices (e.g., smartphones). In the case of online distribution, at least a portion of the computer program product (e.g., downloadable app) may be at least stored temporarily in a server of a manufacturer, a server of an application store, or a machine-readable storage medium such as the memory 110 of a relay server, or temporarily generated.

As described in the above, each element (e.g., a module or a program) according to various embodiments may be formed of a single entity or multiple entities, and some sub-elements of the abovementioned sub-elements may be omitted or other sub-elements may be further included in the various embodiments. Alternatively or additionally, some elements (e.g., modules or programs) may be integrated into one entity and perform the same or similar functions performed by each corresponding element prior to integration. Operations performed by a module, a program, or other element, in accordance with various embodiments, may be executed sequentially, in parallel, repetitively, or in a heuristically manner, or at least some operations may be performed in a different order, omitted, or a different operation may be added.

The term "part" or "module" used in this disclosure may include a unit configured as a hardware, software, or firmware, and may be used interchangeably with terms such as, for example, and without limitation, logic, logic blocks, components, circuits, or the like. "Part" or "module" may be a component integrally formed or a minimum unit or a part of the component performing one or more functions. For example, a module may be formed as an application-specific integrated circuit (ASIC).

The various embodiments of this disclosure may be implemented with software including instructions stored in a machine-readable storage media (e.g., computer). The machine may call a stored instruction from the storage medium, and as a device operable according to the called instruction, may include an electronic device (e.g., electronic device 100) according to the above-mentioned embodiments.

Based on the instruction being executed by the processor 120, the processor 120 may directly or using other elements under the control of the processor 120 perform a function corresponding to the instruction. The instruction may include a code generated by a compiler or executed by an interpreter.

While this disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of this disclosure, including the appended claims and their equivalents.

What is claimed is:

1. An electronic device comprising:
   at least one memory configured to store information of a first neural network model trained to predict an operation of a refrigerator, and information of a second neural network model trained to obtain information associated with a defrosting of the refrigerator; and
   at least one processor configured to:
      obtain first data regarding an operation history of the refrigerator,
      input the first data to the first neural network model, and obtain, from the first neural network model, second data regarding a prediction result for a future operation of the refrigerator, and
      input the second data to the second neural network model, and obtain, from the second neural network model, third data comprising information regarding a degree of frost formation based on an operation of the refrigerator being performed according to the second data, and information regarding controlling a defrost operation of the refrigerator.

2. The electronic device of claim 1, further comprising: a communicator,
   wherein the at least one processor is further configured to control, based on the third data being obtained from the second neural network model, the communicator to transmit the third data to the refrigerator as instructions for the refrigerator to perform the defrost operation according to the third data.

3. The electronic device of claim 2, wherein the information regarding controlling the defrost operation of the refrigerator comprises information regarding a cycle of the defrost operation, information regarding a period of the defrost operation per cycle, and information regarding an intensity of the defrost operation per cycle.

4. The electronic device of claim 3, wherein the at least one processor is further configured to:
   obtain, based on the cycle of the defrost operation according to the information regarding controlling the defrost operation being less than a threshold value, fourth data by changing the information regarding the cycle of the defrost operation to the threshold value in the third data, and
   control the communicator to transmit the fourth data to the refrigerator.

5. The electronic device of claim 4, wherein the at least one processor is further configured to:
   obtain information regarding at least one reason associated with a deterioration in efficiency of the refrigerator, based on the first data, and
   control the communicator to transmit, to the refrigerator, information regarding a guide message corresponding to the at least one reason.

6. The electronic device of claim 5, wherein the at least one processor is further configured to, identify the information regarding the at least one reason based on at least one from among information regarding a temperature range of the refrigerator, information regarding a number of door openings and closings of the refrigerator, information regarding a difference between a maximum temperature inside the refrigerator and a control temperature, or information regarding an outdoor temperature of the refrigerator, and
   wherein the first data comprises the information regarding the temperature range of the refrigerator.

7. The electronic device of claim 1, wherein the first data comprises information on a revolution per minute (RPM) of a fan of the refrigerator, information of a power consumption of a compressor of the refrigerator, and information of a temperature inside the refrigerator, and
   wherein the first neural network model is trained to obtain the second data based on the first data, data on a surrounding environment of the refrigerator, and information on a user of the refrigerator.

8. The electronic device of claim 7, wherein the second data comprises a first prediction value of the RPM of the fan, a second prediction value of the power consumption of the compressor, and a third prediction value of the temperature inside the refrigerator, and
   wherein the second neural network model is trained to obtain information regarding a degree of excessive frost formation based on the first prediction value, the second prediction value, and the third prediction value.

9. The electronic device of claim 1, wherein the first neural network model and the second neural network model are implemented as one integrated neural network model, and the integrated neural network model is trained according to an end-to-end learning method to obtain the third data based on the first data.

10. The electronic device of claim 1, wherein the electronic device and the refrigerator are implemented as one integrated device, and
    wherein the at least one processor is further configured to perform, based on the third data being obtained from the second neural network model, the defrost operation of the refrigerator based on the third data.

11. A method of controlling an electronic device, the method comprising:
    obtaining first data regarding an operating history of a refrigerator;
    obtaining, based on inputting the first data to a first neural network model trained to predict an operation of the refrigerator, second data regarding a prediction result for a future operation of the refrigerator; and
    obtaining, based on inputting the second data to a second neural network model trained to obtain information associated with a defrosting of the refrigerator, third data comprising information regarding a degree of frost formation based on an operation of the refrigerator being performed according to the second data, and information regarding controlling a defrost operation of the refrigerator.

12. The method of claim 11, further comprising transmitting, based on the third data being obtained from the second neural network model, the third data to the refrigerator as instructions for the refrigerator to perform the defrost operation according to the third data.

13. The method of claim 12, wherein the information regarding controlling the defrost operation of the refrigerator comprises information regarding a cycle of the defrost operation, information regarding a period of the defrost operation per cycle, and information regarding an intensity of the defrost operation per cycle.

14. The method of claim 13, further comprising:
    obtaining, based on the cycle of the defrost operation according to the information regarding controlling the defrost operation being less than a threshold value, fourth data by changing the information regarding the cycle of the defrost operation to the threshold value in the third data; and transmitting the fourth data to the refrigerator.

15. The method of claim 14, further comprising:

obtaining information regarding at least one reason associated with a deterioration in efficiency of the refrigerator, based on the first data; and transmitting information on a guide message corresponding to the at least one reason to the refrigerator.

16. A non-transitory computer readable recording medium storing a program that is executed by at least one processor of an electronic device to perform a method of controlling the electronic device, the method comprising:

obtaining first data regarding an operating history of a refrigerator;

obtaining, based on inputting the first data to a first neural network model trained to predict an operation of the refrigerator, second data regarding a prediction result for a future operation of the refrigerator; and obtaining, based on inputting the second data to a second neural network model trained to obtain information associated with a defrosting of the refrigerator, third data comprising information regarding a degree of frost formation based on an operation of the refrigerator being performed according to the second data, and information regarding controlling a defrost operation of the refrigerator.

17. The non-transitory computer readable recording medium of claim 16, wherein the method further comprises transmitting, based on the third data being obtained from the second neural network model, the third data to the refrigerator as instructions for the refrigerator to perform the defrost operation according to the third data.

18. The non-transitory computer readable recording medium of claim 17, wherein the information regarding controlling the defrost operation of the refrigerator comprises information regarding a cycle of the defrost operation, information regarding a period of the defrost operation per cycle, and information regarding an intensity of the defrost operation per cycle.

19. The non-transitory computer readable recording medium of claim 18, wherein the method further comprises:

obtaining, based on the cycle of the defrost operation according to the information regarding controlling the defrost operation being less than a threshold value, fourth data by changing the information regarding the cycle of the defrost operation to the threshold value in the third data; and transmitting the fourth data to the refrigerator.

20. The non-transitory computer readable recording medium of claim 19, wherein the method further comprises:

obtaining information regarding at least one reason associated with a deterioration in efficiency of the refrigerator, based on the first data; and transmitting information on a guide message corresponding to the at least one reason to the refrigerator.

* * * * *